J. NEIMEYER.
CROSS-CUT SAW-HANDLE.
No. 182,321. Patented Sept. 19, 1876.
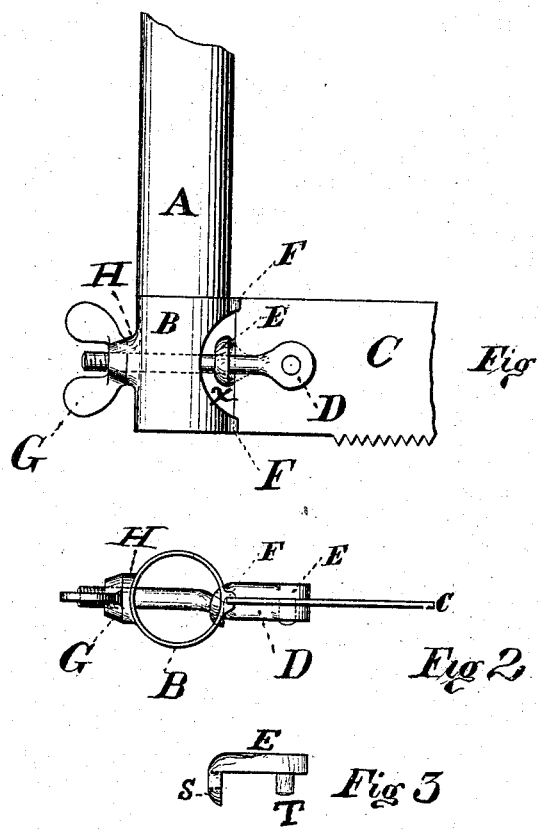
Witnesses:
H. P. K. Peck
W. O. Peck
Inventor:
John Neimeyer

UNITED STATES PATENT OFFICE.

JOHN NEIMEYER, OF TRENTON, OHIO.

IMPROVEMENT IN CROSSCUT-SAW HANDLES.

Specification forming part of Letters Patent No. 182,321, dated September 19, 1876; application filed February 17, 1876.

*To all whom it may concern:*

Be it known that I, JOHN NEIMEYER, of Trenton, in the county of Butler and State of Ohio, have invented a new and useful Improvement in Crosscut-Saw Handles; and I do hereby declare that the following is a full, clear, and exact description thereof, reference being had to the accompanying drawings, and to the letters of reference marked thereon.

Figure 1 is a side elevation of my improved saw-handle in connection with a saw. Fig. 2 is a top view or plan of the same, with the part A removed. Fig. 3 is an edge view of the clasp or adjustable jaw detached.

The saw-handle A is inserted in a ferrule, B, which is provided with a boss, H, for a seat for the thumb-nut G, and four projections, F, two above and two below the throat X, between which there is a depression of proper size to receive the end of the saw-blade C, as represented in the drawings. The eyebolt D is provided with a screw for the thumb-nut G, and the clasp or jaw E is made with a collar, S, through which the eyebolt D is inserted, and is provided with a pin, T, which, when the saw-blade is attached to the handle, enters the eye of bolt D, after passing through a hole in the saw-blade near its end. The throat X in the ferrule and handle serves as a protection for the collar S, and gives room for the adjustment of the parts, when the hole in the saw-blade to be attached is nearer to or farther from the end of the saw-blade.

To connect the handle with the saw the end of the saw-blade C is placed in the notches or grooves formed by the ledges F of the ferrule, and the eyebolt D is inserted through the collar S of clasp E, and through a hole made for the purpose in the handle A and ferrule B, and then (the saw being in place) the pin T of the jaw E is inserted through the hole in the saw-blade and through the eye of bolt D.

When the parts are thus adjusted in position, the thumb-nut G serves to draw the parts together, and hold them rigidly in place.

The tension of the bolt D acts upon pin T, which bears against the saw-plate, while the collar S retains the jaw E and its pin T in their proper relations.

The eyebolt is slightly bent laterally at the place where the collar S surrounds it, which causes the saw-blade to occupy a vertically-central position in relation to the handle A.

What I claim as my invention, as an improvement in detachable saw-handles, is—

1. The jaw E, provided with collar S and pin T, in combination with the eyebolt D, substantially as and for the purpose described.

2. The combination of the laterally-bent eyebolt D, jaw E, and projections F, for securing the saw-blade centrally, substantially as described.

Witness my hand this 9th day of February, A. D. 1876.

JOHN NEIMEYER.

Witnesses:
 H. P. K. PECK,
 SAMUEL MALLERT.